A. W. RANSOME.
CONCRETE MIXER.
APPLICATION FILED APR. 6, 1908.
1,019,917.
Patented Mar. 12, 1912.
2 SHEETS—SHEET 1.
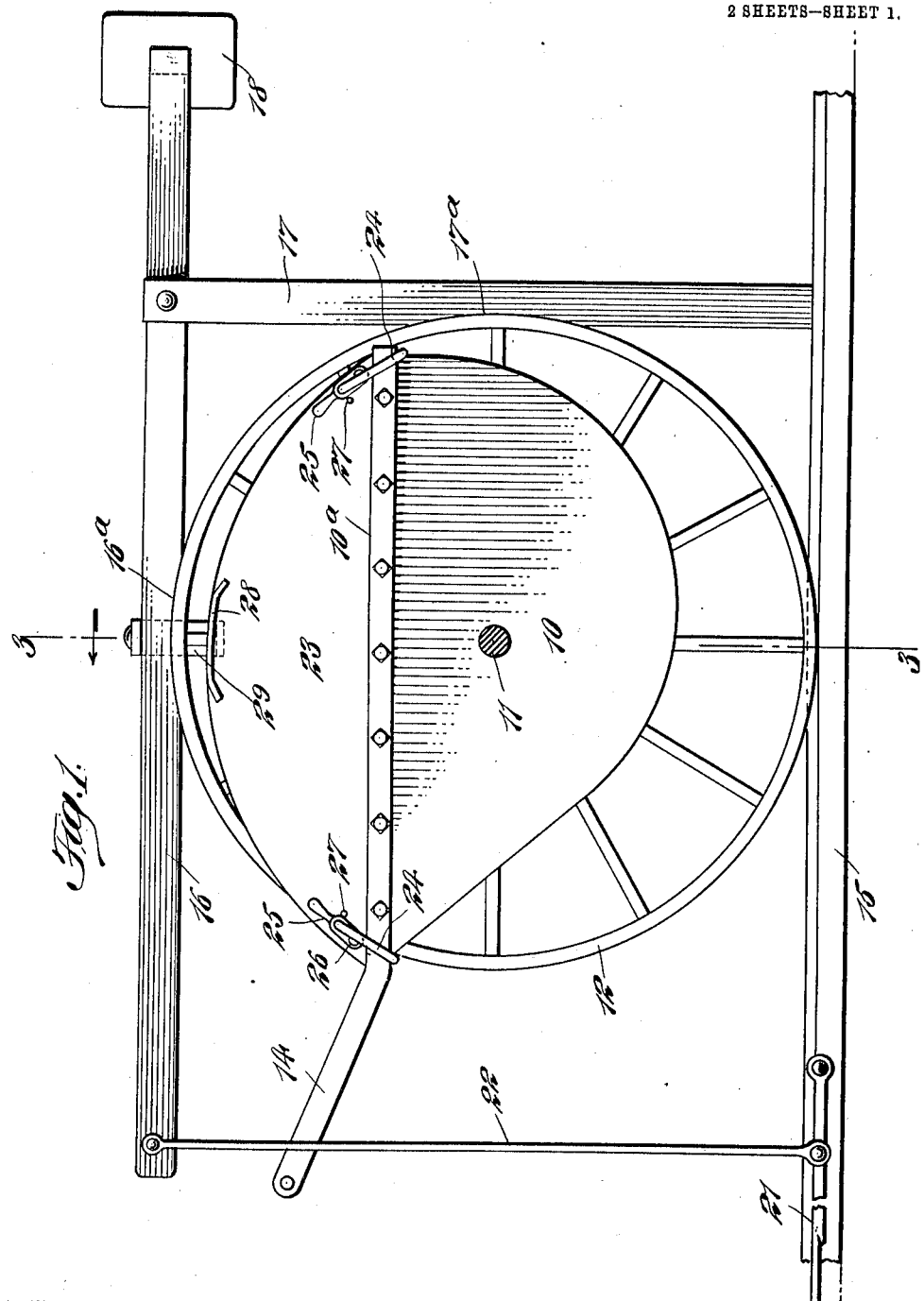
WITNESSES
INVENTOR
Arthur W. Ransome
BY
Isaac B. Owens.
ATTORNEY A. W. RANSOME.
CONCRETE MIXER.
APPLICATION FILED APR. 6, 1908.
1,019,917.
Patented Mar. 12, 1912.
2 SHEETS—SHEET 2.
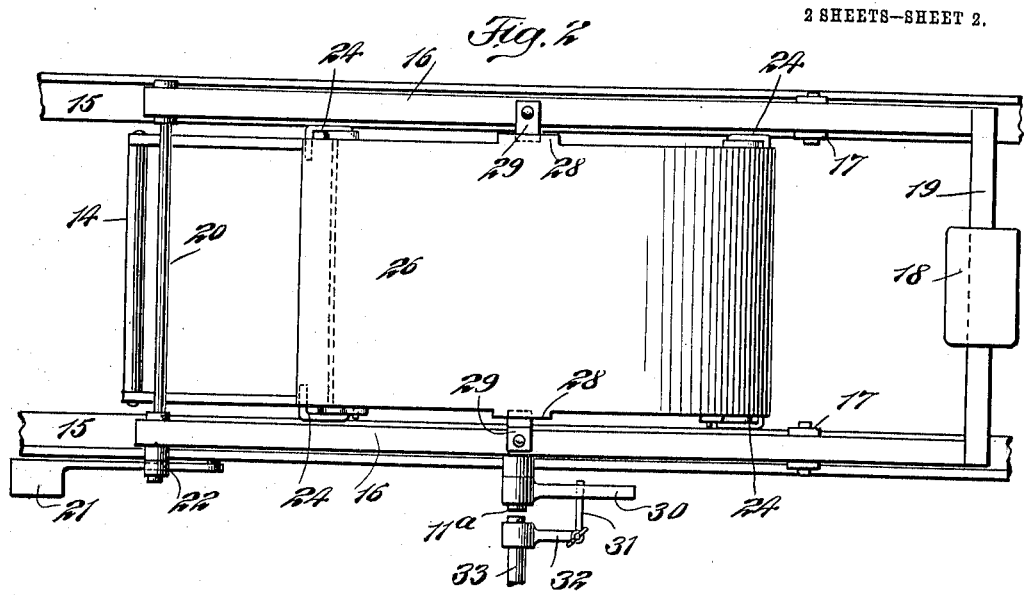
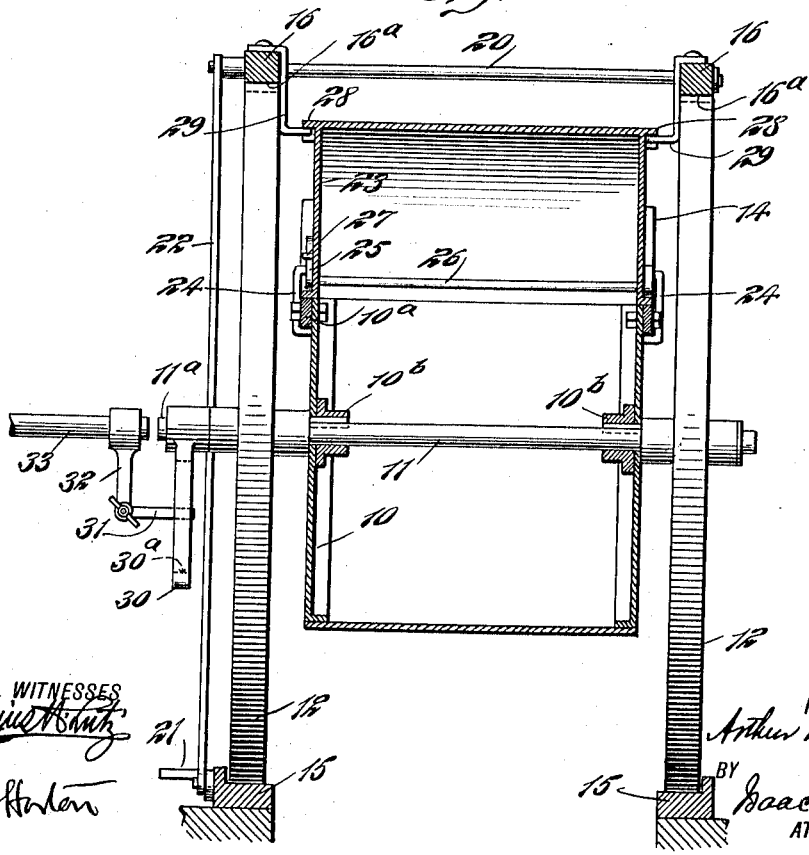

UNITED STATES PATENT OFFICE.

ARTHUR W. RANSOME, OF NEW YORK, N. Y.

CONCRETE-MIXER.

1,019,917.  Specification of Letters Patent.   Patented Mar. 12, 1912.

Application filed April 6, 1908. Serial No. 425,451.

*To all whom it may concern:*

Be it known that I, ARTHUR WILFRED RANSOME, of the city of New York, borough of Richmond, State of New York, have invented certain new and useful Improvements in Concrete-Mixers, of which the following is a full, clear, and exact specification, such as will enable others skilled in the art to which it appertains to make and use the same.

My invention relates to a device for mixing concrete adapted particularly, though not necessarily, for use at temporary installations where comparatively small quantities of concrete are to be mixed at a single point, such for example as the formation of sewers, sidewalks and other running structures necessitating constantly moving the mixing apparatus and the supplies of materials.

The principal object of the invention is to provide means with the assistance of which the usual hand cart or buggy may be transformed into a concrete mixer. From this arrangement results the obvious advantage that the cart may be wheeled about and filled with the materials of the concrete mixture and when this is done, without rehandling these materials, they may be mixed in the cart and the concrete mixture thus formed wheeled to the point of application.

My invention involves various other features of importance, all of which will be fully set forth hereinafter and particularly pointed out in the claims.

Reference is had to the accompanying drawings, which represent the preferred manner of embodying the invention and in which—

Figure 1 is a side elevation of the mixing device, the near wheel of the cart being removed; Fig. 2 is a plan view of the same; and Fig. 3 is a transverse section on the line 3—3 of Fig. 1.

10 indicates the hopper or body of a cart or buggy which may be of various forms of construction, such for example as that forming the subject of the prior patent to Arthur W. Ransome, dated December 12, 1905, Number 807,129. Through the body or hopper 10 is passed the axle shaft 11, which is keyed to collars $10^b$ fastened to and forming parts of the body, and on the projecting ends of the shaft 11 are mounted loosely the wheels 12, beyond one of which the corresponding end of the shaft is slightly projected as indicated at $11^a$. The body of the cart is fitted with a handle 14, and it will be seen that the cart thus constructed may be wheeled about at will in the usual and well understood manner.

At any convenient location, tracks or wheel beds 15 are arranged, these being horizontal and parallel and spaced sufficiently to carry the wheels 12 when the cart is moved onto the tracks. Above the tracks 15 and in the vertical planes thereof are arranged brakes 16 in the form of horizontal beams pivoted near one end of the stanchions 17 and provided at said end with a counter weight 18 attached to the brakes by a cross shaft 19. At their opposite ends the brakes are suitably connected, as for example by a cross rod 20 and to these ends a treadle device 21 is connected by a rod 22. The brakes 16 are concaved as at $16^a$ to fit the wheels 12 as shown in Fig. 1, and the stanchions 17 are similarly concaved as at $17^a$ for the same purpose.

23 indicates a cover adapted to close the normally open top of the body 10 of the cart and so shaped at its lower edge that it matches accurately with the upper edge of the body and, when in place, effectually seals the same. This cover is provided with means for removably securing it in place on the cart body which means as here shown comprise dog-hooks 24 adapted to engage under the corners of the top bead $10^a$ of the cart body and pivoted on crank handles 25 in turn pivotally mounted on the cover 23 through the medium of cross shafts 26. These shafts 26 are mounted in the ends of the cover and serve to connect the crank handles 25 in pairs, so that by operating the two handles at one side of the cover the handles at the other side will also be operated through the medium of the cross shafts.

27 indicates stop pins secured to the cover to limit the movement of the crank-handles. These stop pins allow the crank handles to move slightly beyond center and thus retain the dog-hooks in active position. The dog hooks may be released by simply throwing outward the crank-handles thus relaxing the pressure on the dog hooks.

At its top edges the cover 23 is provided with ears 28 which are adapted to be engaged, when the device is not in operation, by hooks 29 on the brakes 16, and by which the cover may be supported in elevated position clear of the cart body 10.

To the before described projecting end 11ᵃ of the shaft 11 is secured either permanently or removably an arm 30 which is provided with a slot 30ᵃ or other means for engagement with the adjustable wrist pin 31 of a crank 32 on a rotary drive shaft 33. For rotating the body of the cart and its shaft 11ᵃ drive shaft 33 is mounted permanently in a position corresponding axially with the position of the shaft 11 when the cart is in engagement with the brakes and stanchions and the devices 29, 30, 31, and 32 are provided as a convenient means of releasably connecting the two shafts to rotate as a unit. Obviously these specific means are not essential and may be varied without departing from the spirit of my invention. The drive shaft 33 is supported and rotated by any suitable means (not shown).

In the operation of the invention the cart is wheeled about in the usual manner and loaded in the proper proportions with the various materials forming the concrete mixture, such as cement, sand, grit, broken stone, and water. The cart is then run onto the tracks 15 until its wheels seat themselves in the concaves 17ᵃ of the stanchions 17. The operator thereupon depresses the treadle 21, which results in engaging the concaves 16ᵃ of the brakes 16 with the top of the cart wheel and also in lowering the cover 23, shown in the drawings, on to the top edge of the cart body. The operator retaining the treadle 21 in its depressed position should then throw the crank handles 25 to engage the dog-hooks 24 with the bead 10ᵃ of the cart body; and finally the wrist pin 31 should be engaged with the arm 29. These operations, it will be seen, result in holding the wheels of the cart firmly against rotation and in tightly seating on the body of the cart the cover 23, the hooks 29 dropping with the brakes 16 below and out of contact with the ears 28. Then by releasing the handle 14 and starting the rotation of the drive shaft 33, the shaft 11, body 10 and cover 23 will be rotated with the shaft and the materials in the body 10 violently agitated and thoroughly mixed. The mixing action is increased by the irregular form of the body 10 and cover 23. When the mixing is finished, the rotating of the drive shaft 33 should be stopped, the cart body placed in upright position and dog-hooks 24 released. Then upon relaxing pressure on the treadle 21, the counterweight 18 will lift the brakes, and through the hooks 29 and ears 28, lift the cover 23 clear of the cart body. The cart will then be free to be wheeled to the point of application of the concrete in the usual manner.

My invention, it will be seen, greatly facilitates the handling of concrete, as it enables all of the work to be performed without removing the aggregate from the cart; and any quantity of concrete may be mixed and handled by multiplying proportionately the carts and other parts of the invention.

Having thus described the preferred embodiment of my invention, what I claim as new and desire to secure by Letters Patent of the United States is:—

1. A device for mixing concrete comprising a cart body, an axle to which the body is fastened, cart wheels loose on the said axle, means for releasably holding the wheels against movement, a cover for the cart body arranged to move in and out of action, in unison with the means for holding the wheels and means for imparting rotation to the said axle, such means having releasable connection therewith.

2. A device for mixing concrete comprising a cart body, an axle to which the body is fastened and with which it may rotate, cart wheels loose on the said axle, means for releasably holding the wheels against movement, a cover for the cart body, means connecting the cover with the means for holding the wheels whereby to move the cover in and out of position in unison with such means for holding the wheels.

3. A device for mixing concrete comprising a cart body, an axle to which the body is fastened and with which it may rotate, cart wheels loose on the said axle, means for releasably holding the wheels against movement, a cover for the cart body, means connecting the cover with the means for holding the wheels whereby to move the cover in and out of position in unison with such means for holding the wheels, and releasable latches for securing the cover in position.

4. In a device for mixing concrete the combination of a wheeled cart, releasable means for holding the cart wheels against movement, releasable means independent of the cart for rotating the body of the cart while the wheels are stationary, and a cover for the cart body carried by said first-mentioned means when the latter is in inoperative position.

5. In a device for mixing concrete, the combination of a wheeled cart, releasable means for holding the cart wheels against movement, releasable means independent of the cart for rotating the body of the cart while the wheels are stationary, a cover for the cart body carried by said first-mentioned means when the latter is in inoperative position, and releasable means for fastening the cover in place on the body when said first-mentioned means is in operative position.

6. In a device for mixing concrete, the combination of a wheeled cart, releasable means for holding the cart wheels against movement, releasable means for rotating the body of the cart, a cover for the cart body, and means connecting the cover and said means for holding the cart wheels, whereby the cover and said means are moved into and out of action simultaneously.

7. In a device for mixing concrete, the combination of a wheeled cart, releasable means for holding the cart wheels against movement, releasable means for rotating the body of the cart, a cover for the cart body, releasable means for fastening the cover in place, and means connecting the cover and said means for holding the cart wheels, whereby the cover and said means go into and out of action simultaneously.

8. In a device for mixing concrete, the combination of a wheeled cart, a brake adapted to engage a wheel of the cart to hold the same, a cover for the cart body connected with the brake to move in and out of action in unison therewith and means for rotating the cart body.

9. In a device for mixing concrete, the combination of a wheeled cart, a brake to hold a wheel thereof, a cover for the cart body, a hook on the brake engaging loosely a part on the cover to move the cover in unison with the brake and means for rotating the cart body.

10. In a device for mixing concrete, the combination of a wheeled cart, a stanchion adapted to be engaged by the wheel of the cart, a removable cover for the cart body, means for sustaining the cover from the stanchion and means for rotating the cart body.

11. In a device for mixing concrete, the combination of a wheeled cart, a stanchion adapted to be engaged by the wheel of the cart, a brake mounted on the stanchion, a cover for the cart body, means for rotating the cart body and means connecting the brake and cover to cause them to move in and out of action in unison.

12. In a device for mixing concrete, the combination of a wheeled cart, a stanchion adapted to be engaged by the wheel of the cart, a brake mounted on the stanchion, a cover for the cart body, means for rotating the cart body, and means connecting the brake and cover to cause them to move in and out of action in unison, such means comprising a depending hook on the brake loosely engaging a part of the cover.

13. In a device for mixing concrete, the combination of a wheeled cart, a brake adapted to engage a wheel of the cart to hold the same, a cover for the cart body connected with the brake to move in and out of action in unison therewith and means for rotating the cart body, said cover and brake being mounted independently of the cart.

14. In a device for mixing concrete, the combination of wheeled transporting cart having an open topped body, a stationary frame adapted to receive said cart and hold the same against bodily movement, a cover carried by said frame and adapted to engage with the open top of said body to close the same and means for rotating the body of the cart and the cover while said cart is held within said frame.

15. A device for mixing concrete including a wheeled transporting cart provided with an open top body, stationary means adapted to receive the cart and hold it against bodily movement, power means adjacent said last mentioned means for rotating the cart body and a cover for said cart body separable therefrom and normally supported adjacent said first mentioned means.

16. A device for mixing concrete including a wheeled transporting cart, a stationary frame adapted to receive the cart and holding the same against bodily movement, a cover for said cart and means disposed adjacent said frame for imparting continuous rotation to the cart body.

ARTHUR W. RANSOME.

Witnesses:
FRANK V. LAWRENCE,
ALMA CORDLER.

---

Copies of this patent may be obtained for five cents each, by addressing the "Commissioner of Patents, Washington, D. C."